(12) United States Patent
Wu

(10) Patent No.: US 7,377,458 B1
(45) Date of Patent: May 27, 2008

(54) GRINDER

(75) Inventor: Hua-Te Wu, Tainan (TW)

(73) Assignee: Yienn Lih Enterprise Co., Ltd., Tainan (TW)

( * ) Notice: Subject to any disclaimer, the term of this patent is extended or adjusted under 35 U.S.C. 154(b) by 0 days.

(21) Appl. No.: 11/882,129

(22) Filed: Jul. 31, 2007

(51) Int. Cl.
*A01D 34/90* (2006.01)
*A47J 42/00* (2006.01)
*A47J 43/00* (2006.01)

(52) U.S. Cl. .................... 241/169.1; 241/146
(58) Field of Classification Search ............... 241/168, 241/169.1, 146
See application file for complete search history.

(56) References Cited

U.S. PATENT DOCUMENTS 4,509,698 A * 4/1985 David .................. 241/169.1
4,925,150 A * 5/1990 Tedioli .................. 241/169.1
5,651,506 A * 7/1997 Hockey .................. 241/169.1
6,491,244 B2 * 12/2002 Pedersen ................ 241/169.1

* cited by examiner

*Primary Examiner*—Bena Miller
(74) *Attorney, Agent, or Firm*—Rosenberg, Klein & Lee

(57) ABSTRACT

A grinder includes a body, an upper sleeve-shaped member pivoting on the body and dividing an inside of the body into inner and outer rooms, a cover pivoting on the sleeve-shaped member, a connecting rod joined to a middle of the cover and extending through the inner room, an inner toothed ring joined to a lower end of the connecting rod, an intermediate toothed ring secured to a lower end of the sleeve-shaped member, and an outer toothed ring secured in a lower end of the body; the intermediate toothed ring has grinding teeth on inner and outer sides; the inner toothed ring and the inner grinding teeth of the intermediate toothed ring constitute an inner grinding mechanism for grinding seasoning pellets held in the inner room of the body; the outer grinding teeth of the intermediate toothed ring and the outer toothed ring constitute an outer grinding mechanism.

13 Claims, 6 Drawing Sheets

GRINDER

BACKGROUND OF THE INVENTION

1. Field of the Invention

The present invention relates to a grinder, more particularly one, which includes a body divided into inner and outer holding rooms, an inner grinding mechanism to grind a kind of seasoning pellets held in the inner holding room, and an outer grinding mechanism to grind another kind of seasoning pellets held in the outer holding room, thus occupying less space than two separate single-purpose grinders.

2. Brief Description of the Prior Art

There are a wide variety of seasonings available for making foods have unique flavor and more delicious in cooking and dinning. Black pepper, white pepper, and rock salt are among the most popular seasonings.

Such seasonings are usually preserved in pellets, and have to be ground into small particles for use by means of a grinder. Referring to FIG. 6, a common grinder includes a hollow body 91, a grinding mechanism 92 arranged in a lower portion of the hollow body 91, and a rotating member 93 pivoting on a top of the hollow body 91 for operating the grinding mechanism 92. The grinding mechanism 92 includes an outer toothed ring 922 secured in the hollow body 91, an inner toothed ring 921 arranged within the outer toothed ring 922, a connecting rod 923, which is joined to the rotating member 93, and the inner toothed ring 921 at two ends thereof. Therefore, the inner toothed ring 921 will rotate relative to the outer toothed ring 922 to grind seasoning pellets held in the hollow body 91 when the user rotates the rotating member 93. Furthermore, the connecting rod 923 has an upper threaded portion 9231, which is passed through the rotating member 93, and passed into and threaded engaged with a screw hole 941 of an adjustment knob 94 positioned on a top of the rotating member 93; thus, the adjustment knob 94 can be turned relative to the connecting rod 923 to adjust the size of an aperture between the inner and the outer toothed rings 921 and 922 in order for allowing the grinding mechanism 92 to grind the seasoning pellets into particles of an appropriate fineness.

However, the user is only allowed to use such a grinder to hold and grind one kind of seasoning pellets, and in turn he/she has to use several grinders to hold different kinds of seasoning pellets that are used a lot in cooking and dinning; the plural grinders will occupy relatively much space on the dinning table. Therefore, the grinders aren't convenient to use.

SUMMARY OF THE INVENTION

It is a main object of the present invention to provide an improvement on a grinder to overcome the above problem.

A grinder according to an embodiment of the present invention includes a body, an upper sleeve-shaped member pivoting on the body and dividing an inside of the body into inner and outer holding rooms, an upper cover pivoting on the sleeve-shaped member, a connecting rod joined to a middle of the upper cover and extending through the inner holding room, an inner toothed ring joined to a lower end of the connecting rod, an intermediate toothed ring secured to a lower end of the upper sleeve-shaped member, and an outer toothed ring secured in a lower end of the body; the intermediate toothed ring has grinding teeth on both inner and outer sides. The inner toothed ring and the inner grinding teeth of the intermediate toothed ring constitute an inner grinding mechanism, which will function to grind a first kind of seasoning pellets held in the inner holding room of the body when the upper covering member is rotated relative to the upper sleeve-shaped member and the body. The outer grinding teeth of the intermediate toothed ring and the outer toothed ring constitute an outer grinding mechanism, which will function to grind another kind of seasoning pellets held in the outer holding room when the upper sleeve-shaped member is rotated relative to the body.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
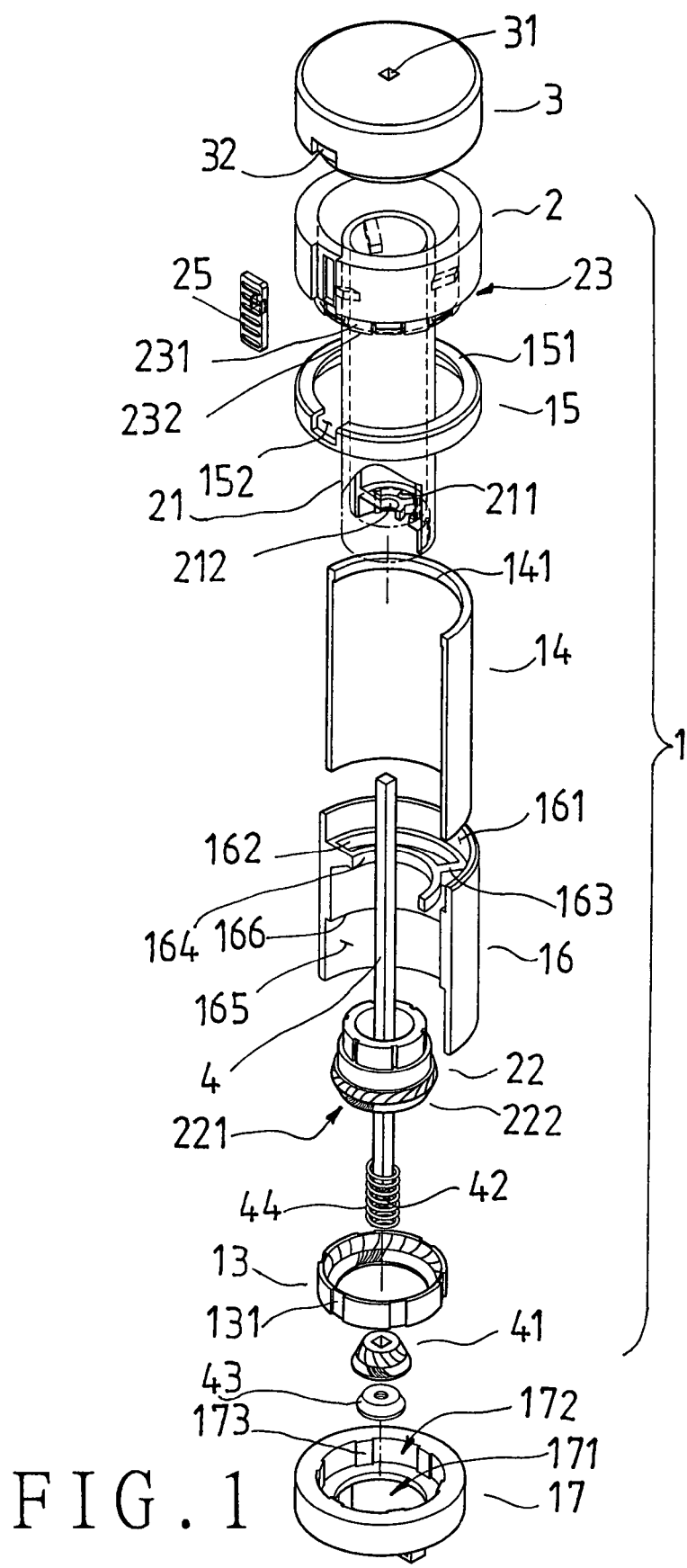
FIG. 1 is an exploded perspective view of the present invention.
Figure 2:
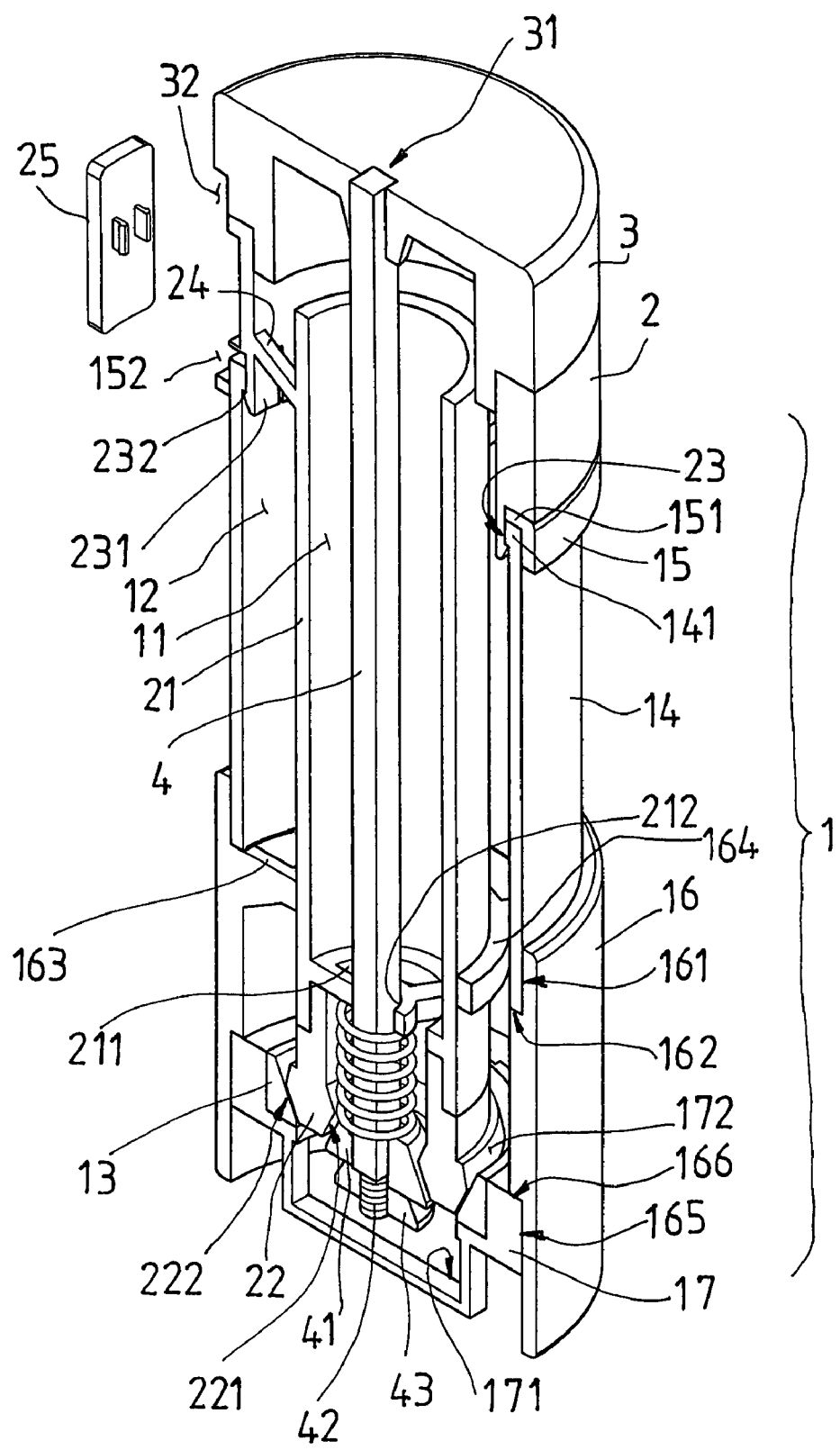
FIG. 2 is a perspective sectional view of the present invention.
Figure 3:
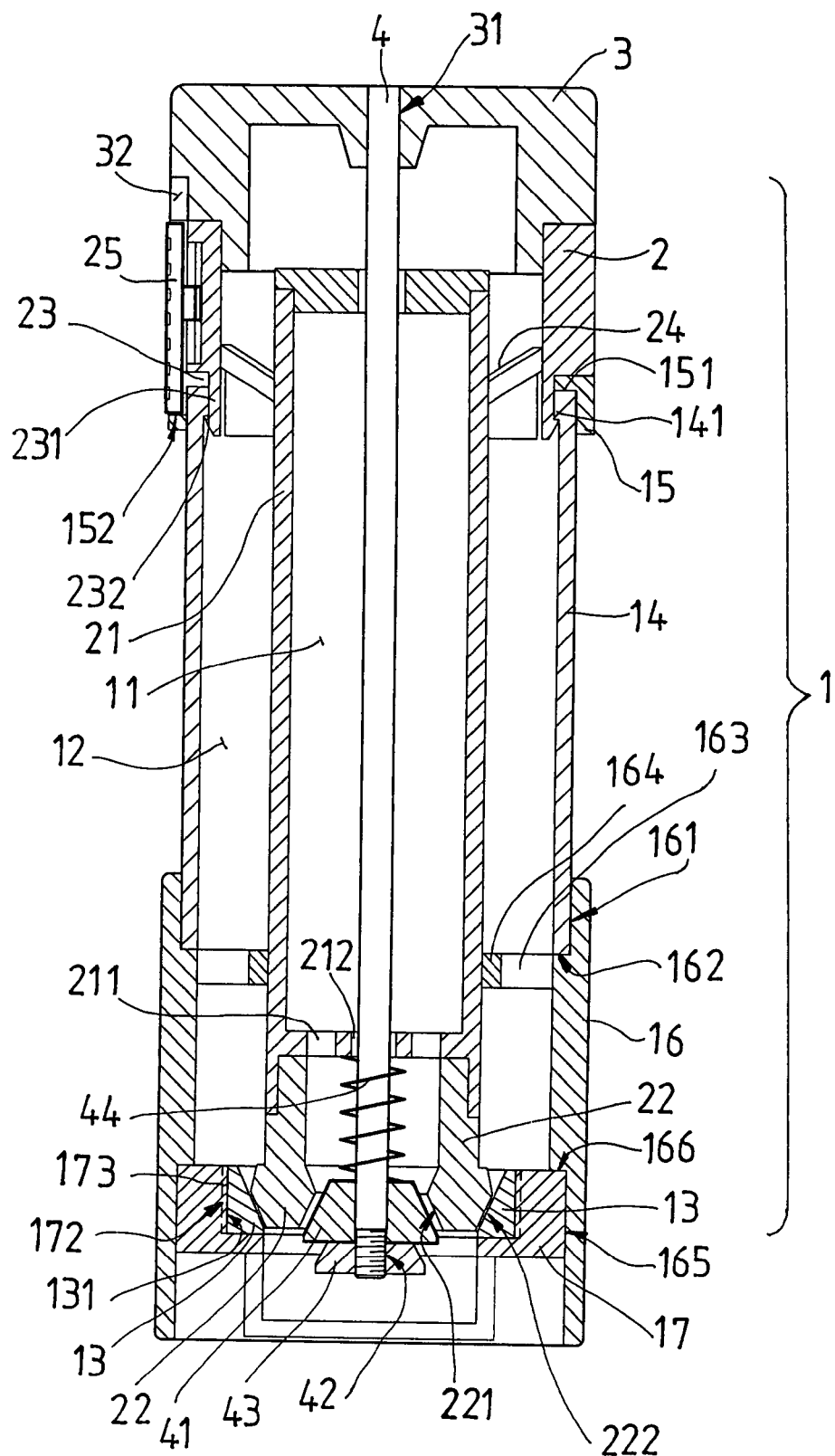
FIG. 3 is a lateral sectional view of the present invention.

Referring to FIGS. 1, 2, and 3, a preferred embodiment of a grinder of the present invention includes a body 1, an upper sleeve-shaped member 2, an upper covering member 3, and a connecting rod 4.

The upper sleeve-shaped member 2 has a sleeve 21 secured on a middle thereof, and it pivots on the body 1 with the sleeve 21 being received in the body 1; the sleeve 21 divides an inside of the body 1 into an inner holding room 11, and an outer holding room 12; the inner holding room 11 is surrounded by an inner side of the sleeve 21 while the outer holding room 12 is defined by an inner side of the body 1 and an outer side of the sleeve 21. The upper covering member 3 pivots on a top of the upper sleeve-shaped member 2. The connecting rod 4 passes into and jams up in a center of the upper covering member 3 at an upper end thereof, and it extends through a lower end of the inner holding room 11.

The body 1 comprises:

an upper tube part 14, which is hollow, and has an detainment protrusion 141 on an upper periphery of an inner side thereof;

a surrounding ring 15 positioned around an upper end of the upper tube part 14, the surrounding ring 15 has an inner diameter slightly greater than an outer diameter of the upper tube part 14; the surrounding ring 15 has a protrusion 151 on an upper periphery of an inner side thereof to rest on a top of the upper tube part 14; the surrounding ring 15 further has a gap 152;

a lower tube part 16, which is joined to the upper tube part 14 with an upper end thereof being around a lower end of the upper tube part 14; the upper end of the lower tube part 16 has an annular recess 161 on an inner side thereof so as to have an inner diameter greater than an outer diameter of the upper tube part 14; the lower tube part 16 further has a step portion 162 next to a lower edge of the annular recess 161, which is in contact with the lower end of the upper tube part 14 so as to prop the upper tube part 14; the lower tube part 16 further has a position-limiting ring 164 around the sleeve 21 secured on the upper sleeve-shaped member 21 for limiting the sleeve 21; the position-limiting ring 164 is secured in a middle of the upper portion of the lower tube part 16 by means of several racks 163, which are disposed apart from each other to have intervening spaces for seasonings to pass through; a lower end of the lower tube part 16 has an annular recess 165 on an inner side thereof, and a step portion 166 next to an upper edge of the annular recess 165;

a lower covering part 17 securely joined to the lower end of the lower tube part 16; the lower covering part 17 is received in the lower annular recess 165 of the lower tube part 16 with a top being in contact with the step portion 166 of the lower tube part 16; the lower covering part 17 has a middle through hole 171 for seasonings to pass through; the lower covering part 17 further has an annular recess 172 on an upper section of an inner side thereof, and several jamming protrusions 173 arranged apart on the annular recess 172.

The grinder of the present invention further comprises:

an outer toothed ring 13 secured in the lower end of the body 1; the outer toothed ring 13 has several receiving recesses 131 on an outer side thereof, and is securely held on the annular recess 172 of the lower covering part 17 of the body 1 with the jamming protrusions 173 being respectively received in the receiving recesses 131;

an intermediate toothed ring 22 securely joined to a lower end of the sleeve 21; the intermediate toothed ring 22 has several inner grinding teeth 221 on an inner side, and outer grinding teeth 222 on an outer side thereof; there is an aperture of a predetermined size between the outer toothed ring 13 and the outer grinding teeth 222 of the intermediate toothed ring 22; and an inner toothed ring 41, the inner toothed ring 41 is joined to a lower end of the connecting rod 4 such that there is an aperture between the inner toothed ring 41 and the inner grinding teeth 221 of the intermediate toothed ring 22, and such that the size of the aperture can be adjusted.

The inner grinding teeth 221 of the intermediate toothed ring 22 and the inner toothed ring 41 comprise an inner grinding mechanism of the grinder while the outer grinding teeth 222 of the intermediate toothed ring 22 and the outer toothed ring 13 comprise an outer grinding mechanism.

Furthermore, the upper sleeve-shaped member 2 has the same outer diameter as the surrounding ring 15 of the body 1, and it has an insertion portion 23 to be inserted in the upper tube part 14, which has a diameter slightly smaller than an inner diameter of the upper tube part 14; the insertion portion 23 has several coupling plate-shaped pieces 231 thereon. The coupling plate-shaped pieces 231 each have a hooking protrusion 232 to be hooked over the detainment protrusion 141 of the upper tube part 14 so as to prevent the upper sleeve-shaped member 2 and the body 1 from separating.

The sleeve 21 is secured on a middle of the upper sleeve-shaped member 2 by means of several racks 24, which are arranged apart from each other to have intervening spaces; thus, seasonings can pass into the outer holding room 12 through the intervening spaces between the outer racks 24. The sleeve 21 extends to the lower end of the body 1 through the position-limiting ring 164 of the lower tube part 16. A lower end portion of the sleeve 21 contains a position-limiting ring 212, which is secured to the sleeve 21 by means of several racks 211; the connecting rod 4 passes through the position-limiting ring 212 so as to be limited with the position-limiting ring 212. The racks 212 are arranged apart from each other to have intervening spaces; thus, seasonings in the inner holding room 11 can pass through the intervening spaces between the outer racks 212.

Furthermore, the upper sleeve-shaped member 2 is equipped with a movable fastening piece 25 on an outer side; the upper sleeve-shaped member 2 will be locked to be incapable of rotating relative to the body 1 when the movable fastening piece 25 is pushed downwards so as to be received in the gap 152 of the surrounding ring 15.

The upper covering member 3 covers the top of the upper sleeve-shaped member 2, and has a central hole 31. The upper covering member 3 further has a gap 32; the upper sleeve-shaped member 2 will be fastened to the upper covering member 3 when the movable fastening piece 25 is pushed upwards to be apart from the gap 152 of the surrounding ring 15, and inserted in the gap 32 of the upper covering member 3; thus, both the upper covering member 3 and the upper sleeve-shaped member 2 can't be rotated relative to each other, and they together can be rotated relative to the body 1. Therefore, the intermediate toothed ring 22 secured on the lower end of the sleeve 21 can be rotated relative to the outer toothed ring 13 by means of manually rotating the upper covering member 3 and the upper sleeve-shaped member 2.

The connecting rod 4 is jammed in the central hole 31 of the upper covering member 3 at the upper end so as to rotate together with the upper covering member 3. The connecting rod 4 further has threads 42 on a lower end portion thereof, and the inner toothed ring 41 is biased downwards by means of an elastic element 44, which is positioned around the lower portion of the connecting rod 4 and on the top of the inner toothed ring 41. And, a threaded fixing element 43 is joined to the threaded lower end portion of the connecting rod 4 to prop the inner toothed ring 41. Thus, there is an aperture between the inner toothed ring 41 and the inner grinding teeth 221 of the intermediate toothed ring 22, and the size of the aperture can be adjusted by means of turning the threaded fixing element 43 relative to the connecting rod 4 so as to change position of the threaded fixing element 43.

Figure 4:
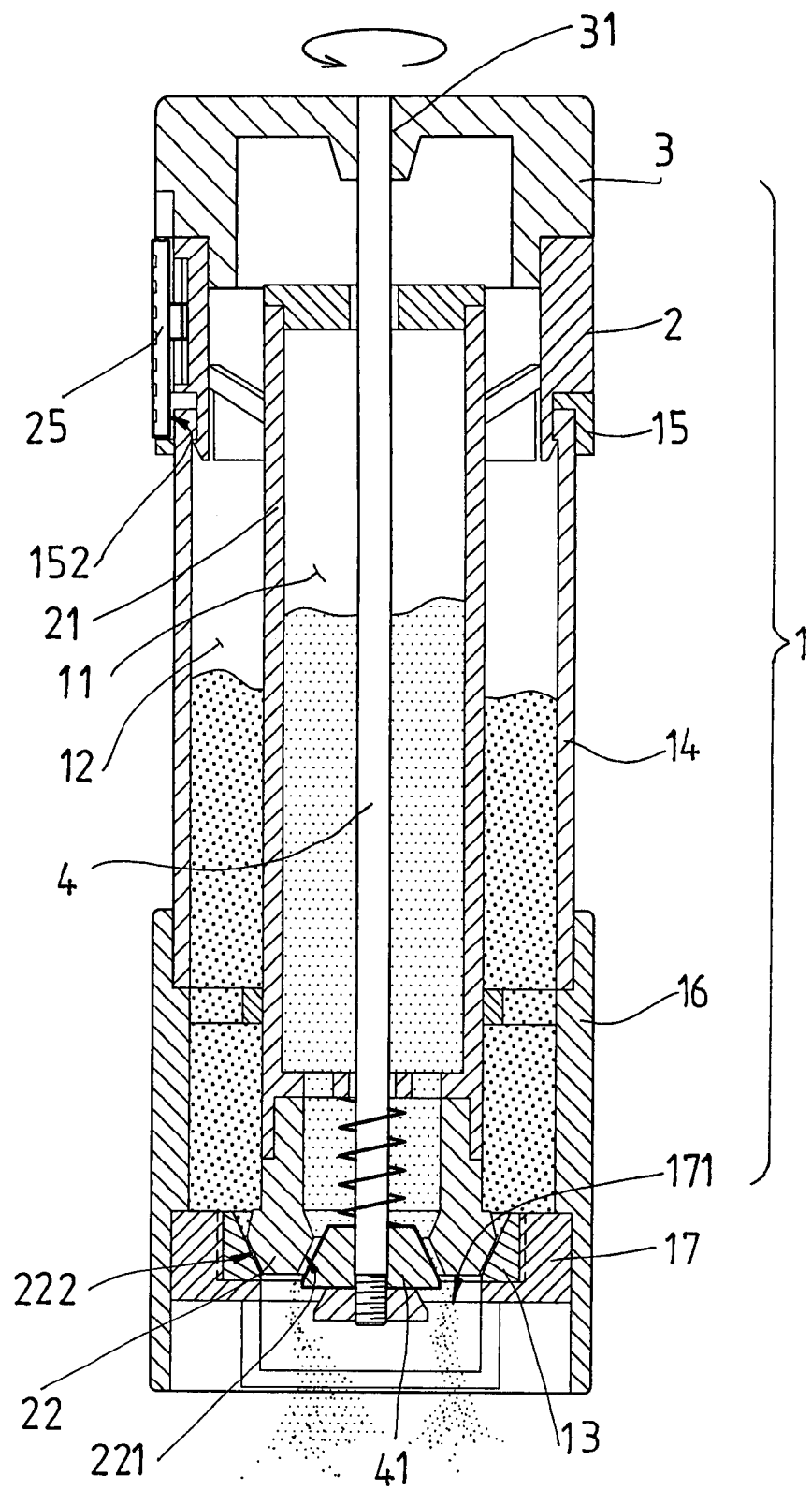
FIG. 4 is a lateral sectional view of the present invention with the inner grinding mechanism being worked.

Referring to FIG. 4, to use the grinder of the present invention, the upper covering member 3 is removed first, and next two different kinds of seasoning pellets are respectively poured into the inner holding room 11, i.e. the inside of the sleeve 21, and the outer holding room 12, i.e. the space between the body 1 and the sleeve 21; thus, the two different kinds of seasoning pellets fall onto the inner and the outer grinding mechanism. Then, the upper covering member 3 is put back on the grinder.

To use the seasonings in the inner holding room 11, first the movable fastening piece 25 is slid downwards to be received in the gap 152 of the surrounding ring 15 of the body 1; thus, the upper sleeve-shaped member 2 is fastened to the body 1 to be incapable of rotating relative to the body 1. Then, the upper covering member 3 is rotated relative to the body 1 so as to rotate the inner toothed ring 41 relative to the inner grinding teeth 221 of the intermediate toothed ring 22 secured on the lower end of the sleeve 21; thus, the inner grinding mechanism starts grinding the seasoning pellets contained in the inner holding room 11 into small particles. Consequently, the seasonings fall out of the inner holding room 11 through the middle hole 171 of the lower covering part 17 of the body 1.

Figure 5:
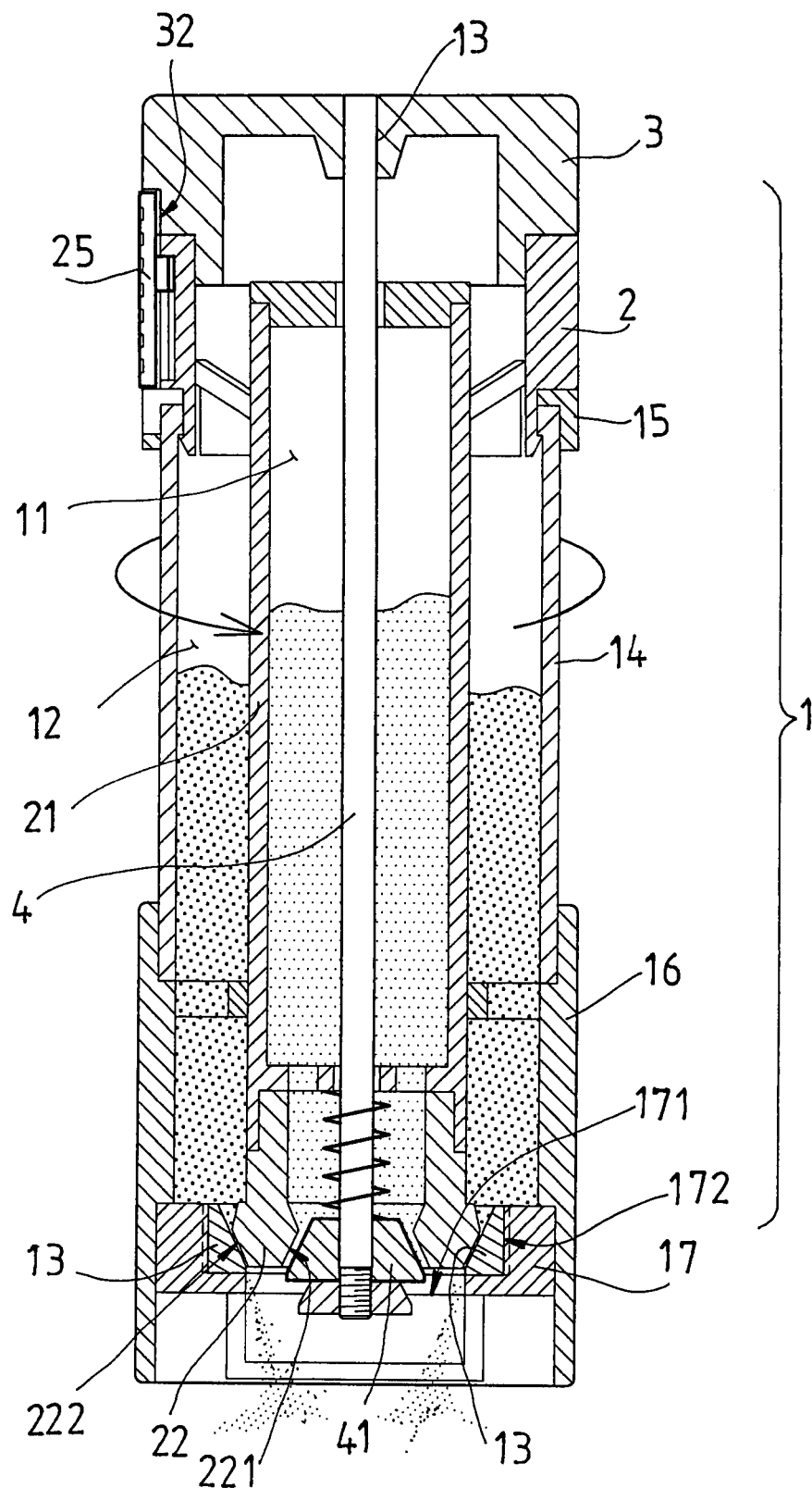
FIG. 5 is a lateral sectional view of the present invention with the outer grinding mechanism being worked.
Figure 6:
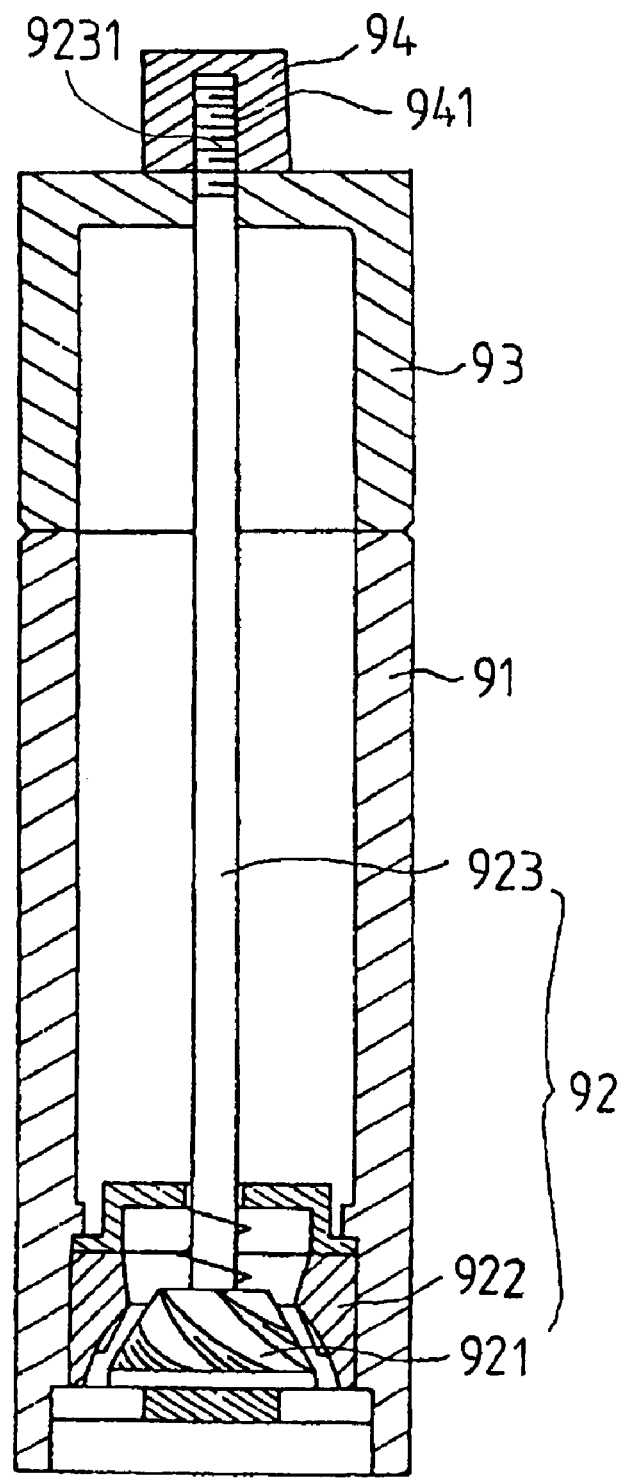
FIG. 6 is a lateral sectional view of the prior art.

Referring to FIG. 5, to use the seasonings in the outer holding room 12, first the movable fastening piece 25 is slid upwards to be received in the gap 32 of the upper covering member 3; thus, the upper sleeve-shaped member 2 is fastened to and incapable of rotating relative to the upper covering member 3. Then, the upper covering member 3 and the upper sleeve-shaped member 2 are rotated together so as to rotate the intermediate toothed ring 22 relative to the outer toothed ring 13 secured in the lower covering part 17 of the body 1; thus, the outer grinding mechanism, which comprises the outer grinding teeth 222 of the intermediate toothed ring 22, and the outer toothed ring 13, starts to grind the seasoning pellets held in the outer holding room 12 into small particles. Consequently, the seasonings fall out of the outer holding room 12 through the middle hole 171 of the lower covering part 17 of the body 1.

From the above description, it can be seen that the present invention has the following advantages:

1. The seasoning grinder of the present invention has the inner and the outer holding rooms to hold two different kinds of seasoning pellets, and it includes the inner and the outer grinding mechanisms, which are used to grind the two kinds of seasoning pellets respectively; with the present grinder, the user is allowed to grind and dispense either one of the two kinds of seasonings at a time without preparing two separate conventional seasoning grinders. Consequently, the present invention can save space on the dinning table.

2. For the above reasons, the seasoning grinder of the present invention is practical and convenient to use.

What is claimed is:

1. A grinder, comprising
    a body,
    an upper sleeve-shaped member pivoting on the body; the upper sleeve-shaped member having a sleeve extending to a lower end of an inside of the body; the sleeve dividing the inside of the body into an inner holding room, and an outer holding room;
    an upper covering member pivoting on the upper sleeve-shaped member;
    a connecting rod passing into and jamming up in a middle of the upper covering member; the connecting rod extending to a lower end of the inner holding room;
    an inner toothed ring secured to a lower end of the connecting rod;
    an intermediate toothed ring secured to a lower end of the sleeve;
    the intermediate toothed ring having a plurality of inner grinding teeth on an inner side; the intermediate toothed ring having a plurality of outer grinding teeth on an outer side thereof; and
    an outer toothed ring secured in a lower end of the body;
    the inner toothed ring and the inner grinding teeth of the intermediate toothed ring constituting an inner grinding mechanism, which will start functioning when the upper covering member is rotated relative to the upper sleeve-shaped member as well as the body;
    the outer grinding teeth of the intermediate toothed ring and the outer toothed ring constituting an outer grinding mechanism, which will start functioning when the upper sleeve-shaped member is rotated relative to the body.

2. The grinder as claimed in claim 1, wherein the upper sleeve-shaped member is equipped with a movable fastening piece on an outer side thereof, and each of the upper covering member and the body has a gap to receive the movable fastening piece; the movable fastening piece being movable upwards to be received in the gap of the upper covering member so as to make the upper sleeve-shaped member rotatable together with the upper covering member; the movable fastening piece being movable downwards to be received in the gap of the body to fasten the upper sleeve-shaped member to the body.

3. The grinder as claimed in claim 1, wherein the body includes an upper tube part, a surrounding ring positioned around an upper end of the upper tube part, a lower tube part joined to the upper tube part with an upper end thereof being around a lower end of the lower tube part, and a lower covering part positioned around a lower end of the lower tube part.

4. The grinder as claimed in claim 3, wherein the upper tube part of the body has an detainment protrusion on an upper periphery of an inner side thereof, and the upper sleeve-shaped member has an insertion portion, which has a diameter slightly smaller than an inner diameter of the upper tube part, and which is inserted in the upper tube part; the insertion portion having a plurality of coupling plate-shaped pieces thereon; the coupling plate-shaped pieces each having a hooking protrusion hooked over the detainment protrusion of the upper tube part so as to prevent the upper sleeve-shaped member and the body from separating.

5. The grinder as claimed in claim 3, wherein the upper end of the lower tube part has an annular recess on an inner side thereof so as to have an inner diameter greater than an outer diameter of the upper tube part, and the lower tube part has a step portion next to a lower edge of the annular recess, which is in contact with the lower end of the upper tube part.

6. The grinder as claimed in claim 3, wherein the lower tube part has a position-limiting ring around the sleeve of the upper sleeve-shaped member for limiting the sleeve; the position-limiting ring being secured in a middle of an upper portion of the lower tube part by means of a plurality of racks, which are arranged apart from each other to have intervening spaces.

7. The grinder as claimed in claim 3, wherein a lower end of the lower tube part has an annular recess on an inner side thereof, and has a step portion next to an upper edge of the annular recess, and the lower covering part is received in the annular recess of the lower tube part with a top being in contact with the step portion of the lower tube part.

8. The grinder as claimed in claim 3, wherein the lower covering part of the body has a middle through hole.

9. The grinder as claimed in claim 3, wherein the lower covering part of the body has an annular recess on an upper section of an inner side thereof, and has a plurality of jamming protrusions arranged apart on the annular recess while the outer toothed ring of the outer grinding mechanism has a plurality of receiving recesses on an outer side thereof, and it is securely held on the annular recess of the lower covering part with the jamming protrusions being received in the receiving recesses.

10. The grinder as claimed in claim 1, wherein the sleeve is secured on a middle of the upper sleeve-shaped member by means of a plurality of racks, which are arranged apart from each other to have intervening spaces.

11. The grinder as claimed in claim 1, wherein a position-limiting ring is arranged in and secured to the sleeve by means of a plurality of racks, and the connecting rod passes through the position-limiting ring; the racks being arranged apart from each other so as to have intervening spaces.

12. The grinder as claimed in claim 1, wherein the upper covering member has a central hole, and the connecting rod jams in the central hole of the upper covering member.

13. The grinder as claimed in claim 1, wherein the connecting rod has threads on an outer side of a lower end portion thereof, and the inner toothed ring is biased by means of an elastic element, which is positioned around the connecting rod and adjacent to one end of the inner toothed ring; the threaded lower end portion of the connecting rod has a threaded fixing element joined thereto, which is adjacent to other end of the inner toothed ring.

* * * * *